E. J. BREWSTER.
VEHICLE SPRING.
APPLICATION FILED MAR. 4, 1918.
1,287,858.
Patented Dec. 17, 1918.
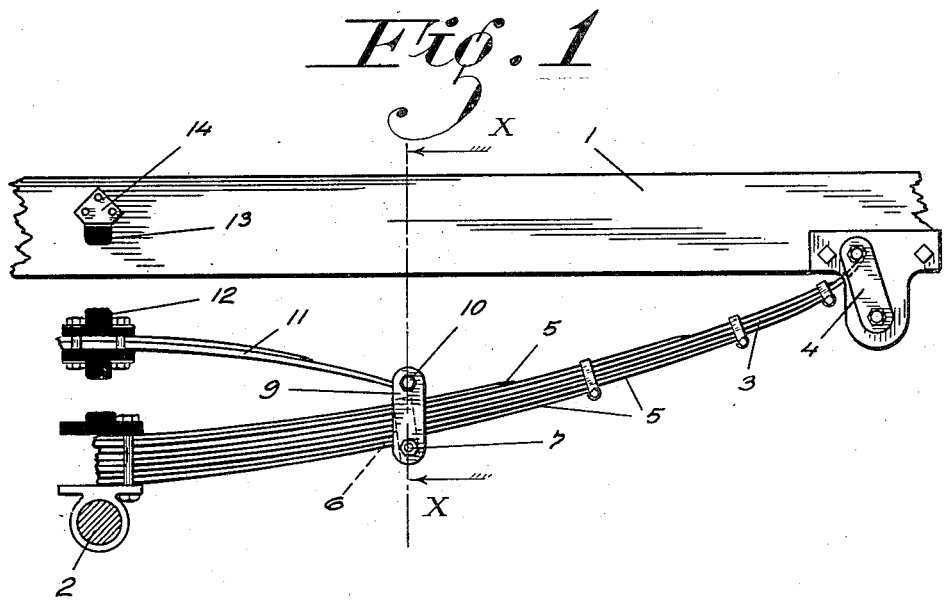
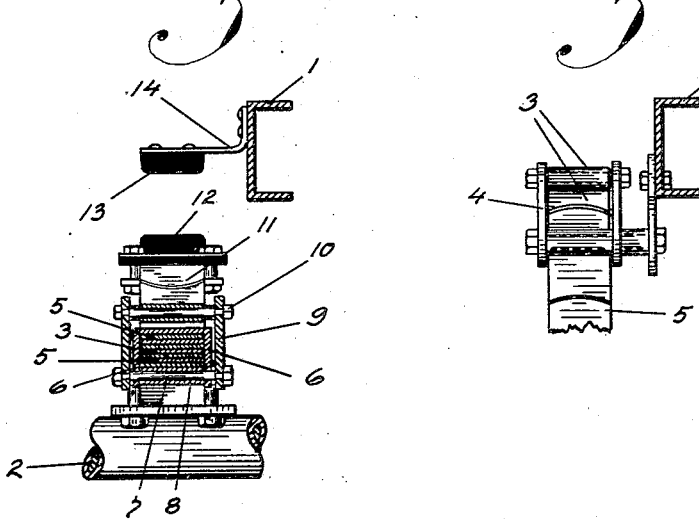
WITNESS:
Bernard Privat
INVENTOR.
Ethelbert J. Brewster
BY
S. Webster
ATTORNEY

UNITED STATES PATENT OFFICE.

ETHELBERT J. BREWSTER, OF FRESNO, CALIFORNIA.

VEHICLE-SPRING.

1,287,858.

Specification of Letters Patent.

Patented Dec. 17, 1918.

Application filed March 4, 1918. Serial No. 220,277.

*To all whom it may concern:*

Be it known that I, ETHELBERT J. BREWSTER, a citizen of the United States, residing at Fresno, in the county of Fresno, State of California, have invented certain new and useful Improvements in Vehicle-Springs; and I do declare the following to be a clear, full, and exact description of the same, reference being had to the accompanying drawings, and to the characters of reference marked thereon, which form a part of this application.

This invention relates to improvements in vehicle springs, particularly to that type used on motor vehicles. The object of the invention is to produce a primary spring having a tensional resistance in either direction and a secondary snubber spring disposed in inverted relation to the primary spring and connected therewith by pivoted shackles whereby both of the springs may have a free longitudinal movement with respect to each other. The secondary spring is designed to prevent the rebound of the primary spring when the same encounters severe shocks.

A further object of the invention is to produce a simple and inexpensiv device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a side elevation of one-half of the spring structure.

Fig. 2 is a sectional view taken on a line X—X of Fig. 1.

Fig. 3 is an end view of the spring structure partly broken away.

Referring now more particularly to the characters of reference on the drawings, the numeral 1 designates the chassis of the vehicle, and 2 the axle thereof.

The primary spring constitutes a main spring 3 pivotally connected with the swinging shackles 4. This main spring 3 is reinforced on both sides by springs 5 of lesser length and tension. The springs 3 and 5 are clamped to the axle 2 in the usual manner and at one point are clamped together by means of the clamps 6. These clamps 6 are secured in position by means of bolts 7 and the lower spring 5 is pivotally connected with said bolts 7 by means of sleeves 8. Shackles 9 are pivotally connected on the ends of the bolts 7 and project over the clamps 6 and are provided with top bolts 10. The snubber spring 11 has its ends pivotally mounted on the bolts 10. This spring 11 is mounted in inverse relation to the primary spring and is provided with a rubber bumper 12 adapted to strike against a corresponding bumper 13 mounted on the chassis 1 by means of a bracket 14.

In practice, the springs 5 provide a tensional resistance against the spring 3 and the same acts in either direction. These springs 5 compensate for the rebound under all slight shocks which the spring 3 sustains. When, however, a severe shock is encountered by said primary spring, the rebound spring 11 comes into action by reason of the bumpers 12 and 13 striking each other and this positively prevents the rebound acting against either the springs or the body of the vehicle.

Freedom of motion of the primary and secondary or rebound springs is provided for by means of the freely swinging shackles 9 and the shackles 4.

From the foregoing description, it will readily be seen that I have produced such a device as substantially fulfils the objects of the invention as provided for herein.

While this specification sets forth in detail the present and preferred construction of the device, still in practice, such deviations from such detail may be resorted to as do not form a departure from the spirit of the invention.

Having thus described my invention, what I claim as new and useful and desire to secure by Letters Patent is:—

A spring structure for vehicles comprising a primary leaf spring fixed centrally to the axle of the vehicle, such spring consisting of a main spring pivoted at its ends by shackles to the frame of the vehicle, and leaf springs of a lesser length mounted to and lying adjacent the main spring on both sides thereof, and a secondary or snubber leaf spring mounted to the primary spring above the same and spaced therefrom, such mounting comprising clamps mounted over the spring units of the primary spring, bolts securing said clamps and positioned under the primary spring, shackles pivoted on the bolts and extending over the primary spring on each side of the clamps, bolts projecting through the upper ends of the last named shackles, the secondary spring being inverted with respect to the primary spring and being pivotally mounted on the last named bolts, whereby the two springs may have elongating movement independent of each other, and bumpers on the secondary spring and the frame of the vehicle adapted to contact when the primary spring is subjected to severe shocks.

In testimony whereof I affix my signature in presence of two witnesses.

ETHELBERT J. BREWSTER.

Witnesses:
VERADINE WARNER,
BERNARD PINAT.